United States Patent
Magno Dos Santos et al.

(10) Patent No.: US 10,644,575 B2
(45) Date of Patent: May 5, 2020

(54) SYSTEM FOR GROUNDING BEARINGS OF ROTARY ELECTRIC MACHINES, AND CORRESPONDING ELECTRIC MACHINE

(71) Applicant: WEG EQUIPAMENTOS ELETRICOS S.A., Jaragua do Sul-SC (BR)

(72) Inventors: Nathan Magno Dos Santos, Jaragua do Sul (BR); Alberto Brondani, Jaragua do Sul (BR)

(73) Assignee: WEG EQUIPAMENTOS ELETRICOS S.A., Jaragua do Sul-SC (BR)

( * ) Notice: Subject to any disclaimer, the term of this patent is extended or adjusted under 35 U.S.C. 154(b) by 284 days.

(21) Appl. No.: 15/536,897

(22) PCT Filed: Dec. 19, 2014

(86) PCT No.: PCT/BR2014/000456
§ 371 (c)(1),
(2) Date: Jun. 16, 2017

(87) PCT Pub. No.: WO2016/094972
PCT Pub. Date: Jun. 23, 2016

(65) Prior Publication Data
US 2017/0353087 A1    Dec. 7, 2017

(51) Int. Cl.
*H02K 11/40* (2016.01)
*H01R 39/64* (2006.01)
(Continued)

(52) U.S. Cl.
CPC ............ *H02K 11/40* (2016.01); *H01R 39/12* (2013.01); *H01R 39/64* (2013.01); *H02K 5/14* (2013.01); *H02K 5/16* (2013.01)

(58) Field of Classification Search
CPC ........ H01R 39/12; H01R 39/64; H02K 13/00; H02K 11/40; H02K 5/14; H05F 3/00; H05F 3/02
See application file for complete search history.

(56) References Cited

U.S. PATENT DOCUMENTS 5,661,356 A * 8/1997 Fisher ................ H01R 39/12
310/219
5,804,903 A   9/1998 Fisher et al.
(Continued)

FOREIGN PATENT DOCUMENTS

CN      202435202 U  *  9/2012
WO   WO 2013/192169 A1   12/2013

OTHER PUBLICATIONS

International Search Report for International Application No. PCT/BR2014/000456 dated Apr. 9, 2015, 6 pages.

*Primary Examiner* — Edgardo San Martin
(74) *Attorney, Agent, or Firm* — Knobbe, Martens, Olson & Bear LLP (57) ABSTRACT

The present invention relates to a system for grounding bearings of rotary electric machines (200), especially rotary electric machines (200) controlled by frequency converters, the system comprising an outer ring (1), a contact ring (2), a support ring (3), elements (4) for fastening the rings, optional closure elements (5), elements (6) for fastening the assembly, elements (7) for adjusting the brush, a brush (8) made of a conductive material and a compressive fastening element (9), wherein the outer ring (1) is provided with at least two, preferably four to six housing holes (8A) for housing one or more grounding brushes (8). The present invention further relates to an electric machine provided with a system according to the invention.

13 Claims, 9 Drawing Sheets

(51) Int. Cl.
*H02K 5/14* (2006.01)
*H01R 39/12* (2006.01)
*H02K 5/16* (2006.01)
*H05F 3/02* (2006.01)

(56) References Cited

U.S. PATENT DOCUMENTS

| | | | | |
|---|---|---|---|---|
| 6,188,154 | B1* | 2/2001 | Luedtke | H01H 37/767 |
| | | | | 310/239 |
| 7,193,836 | B2* | 3/2007 | Oh | G11B 19/2009 |
| | | | | 361/212 |
| 7,498,703 | B2* | 3/2009 | Rea, Sr. | H02K 5/124 |
| | | | | 277/412 |
| 8,189,317 | B2* | 5/2012 | Oh | H02K 11/40 |
| | | | | 310/309 |
| 8,432,659 | B2* | 4/2013 | Oh | H02K 11/40 |
| | | | | 361/220 |
| 9,071,092 | B2* | 6/2015 | Hoehle | H01R 39/12 |
| 2004/0233592 | A1* | 11/2004 | Oh | G11B 19/2009 |
| | | | | 361/23 |
| 2007/0159763 | A1* | 7/2007 | Barnard | H01R 39/64 |
| | | | | 361/212 |
| 2007/0222327 | A1* | 9/2007 | Li | H01R 39/38 |
| | | | | 310/239 |
| 2009/0015083 | A1* | 1/2009 | Hsieh | H02K 11/40 |
| | | | | 310/66 |
| 2011/0193446 | A1* | 8/2011 | Orlowski | H01R 39/64 |
| | | | | 310/232 |
| 2011/0204734 | A1 | 8/2011 | Orlowski et al. | |
| 2011/0216466 | A1 | 9/2011 | Oh et al. | |
| 2014/0369821 | A1* | 12/2014 | Finck | H02K 5/10 |
| | | | | 415/174.5 |

* cited by examiner

SYSTEM FOR GROUNDING BEARINGS OF ROTARY ELECTRIC MACHINES, AND CORRESPONDING ELECTRIC MACHINE

FIELD OF THE INVENTION

The present invention relates to a grounding system for the bearings of rotary electrical machines, preferably for machines controlled by frequency converters, to promote the electrical grounding of the bearing, preventing the electric current from damaging said component.

BACKGROUND OF THE INVENTION

In rotary electric machines, the presence of induced electric current is known and is usually found in three-phase motors driven by frequency converters.

Said converters use pulse-width modulation technology to vary the speed of AC machines, thus allowing the use of lower cost AC motors in applications wherein DC motors were used, which are currently more expensive. The main disadvantage of the use of three-phase motors with frequency converters is that the common-mode voltage generated by the converter increases the induced currents in the electric machine rotor.

Therefore, there is the emergence of current flow through the bearings to the motor housing where such a current finds the grounding. While the engine is running, the bearings tend to become more resistant to the current flow, causing an electrical charge buildup on the surfaces of the rotor.

During a short period, the common-mode voltage produces high-level electric charges and, as a result, such charges overcome the electrical resistance imparted by the bearing and an instantaneous arc passes through said bearing. This discharge causes an electroerosion in the component, which can damage the surfaces of the bearing tracks and the bearing balls. This phenomenon reduces the lifespan of the bearing, which may imply premature failure of the same.

STATE OF THE ART

Various technologies have been used in an attempt to overcome this problem. Known attempts include the use of conductive greases, isolated bearings, and the use of grounding brushes.

A low-cost common solution and that has been widely employed, consists of a shaft grounded by copper brushes tensioned by the spring that provide a continuous flow of current to the grounding. Copper brushes, however, wear out very quickly and require frequent maintenance. Another disadvantageous relevant aspect is the oxide accumulation on the shaft and other barriers between the brushes and the shaft tend to reduce the flow of current and cause an electroerosion through the brush and the shaft.

The grounding systems using brushes have an unprotected support against mechanical shock, which leads to possible misalignment of the brushes and the consequent vibration between the brush and the shaft, which can result in the emergence of sparks, a phenomenon unwanted as well.

Another solution employed in the state of the art for grounding of bearings is the use of filaments that slide over the motor shaft. This solution, however, besides having a high cost does not allow simple maintenance of the grounding system, and it is necessary to replace the grounding system completely.

Document US2004233592 describes a grounding system with a plurality of filaments fixed to a ring structure positioned around the shaft of the motor. The filaments are bent in half and trapped in the ring, making the tips protruding to the center where they touch the surface of the shaft. This system has many disadvantages in the attempt to attenuate the electric current of the shaft, such as its fragility, exposure, and difficult maintenance, which requires stopping and uncoupling the engine.

The system disclosed in US2004233592 includes pluralities of individual filaments. When the system is mounted on the shaft of a machine, the correct alignment of the ring with the motor shaft depends only on the fiber filaments that support the ring in a uniform manner around the axis. With the exception of the fiber filaments, there is nothing to ensure that the filaments are properly aligned in relation to the engine shaft. In short, the filaments may be misaligned in relation to the engine shaft, thus, decreasing the mitigation of the electric charge. In addition, it is observed that there is no possibility of maintaining the filaments in the case of wear of the filaments.

Patent US20110193446 describes a filaments grounding system very similar to that disclosed by US2004233592. Both systems do not allow the replacement of the brushes that collect the current from the shaft without stopping the equipment and complete disassembly of the grounding assembly.

In patent CN202435202U and also in US20070159763, the brushes comprise filaments of a conductive fiber and they are exposed to the environment.

So, there is a demand for an efficient and robust grounding system, which can be used effectively during a prolonged period of time, and that, at the same time, requires a minimum effort for the replacement of the grounding brush without the use of tools and with the possibility of replacement of the same without the need of stopping the machine and without compromising the grounding of the shaft in operation.

OBJECTIVES OF THE INVENTION

The present invention aims to overcome the drawbacks of the prior art by eliminating the need to stop the rotary electric machine for maintaining the electrical grounding system, through a mechanically protected system comprising a plurality of removable grounding brushes without the need to use tools, in which said brushes slide on the shaft or on a removable track sliding, this last setting being preferred. Said ring has the objective of preserving the shaft of the rotary electric machine of the marks left by the brushes on the surface in which they come into contact and to promote a path of lower resistance for the electric current, by using materials with resistance to the passage of the electric current smaller than that of steel.

The present invention also intends to provide a protected environment for the grounding brushes with the possibility of installing seals in front of the grounding assembly, increasing the degree of protection of the whole assembly.

Finally, the present invention aims to provide a rotary electric machine by using the proposed system.

DETAILED DESCRIPTION OF THE INVENTION

The mechanically protected grounding system according to the invention, or simply, the system (100), comprises an outer ring (1), a contact ring (2), a support ring (3), elements for fastening the rings (4) and, eventually, closure elements (5), elements for fastening the assembly (6), preferably screws, elements for adjusting the brush (7), conductive material brush (8) and compressive fastening element (9).

The outer ring (1) provides support and protection for the rest of the components by centralizing the assembly through an internal or external fitting located in the front cover of a rotary electric machine (200) comprising the shaft (210).

The outer ring (1) is made of a conductive material, preferably aluminum, comprising housing holes (8A) in which the grounding brushes (8) are housed, also fastening holes of a conductive material for housing the elements for fastening (6), and, finally, a space for housing the assembly of the contact ring (2) track. If requested, therein the installation of sealing systems is possible, making the system protected with a protection degree up to IP66.

In a preferred embodiment of the invention, the outer ring (1) is provided with at least two, preferably from four to six housing holes (8A).

Figure 1:
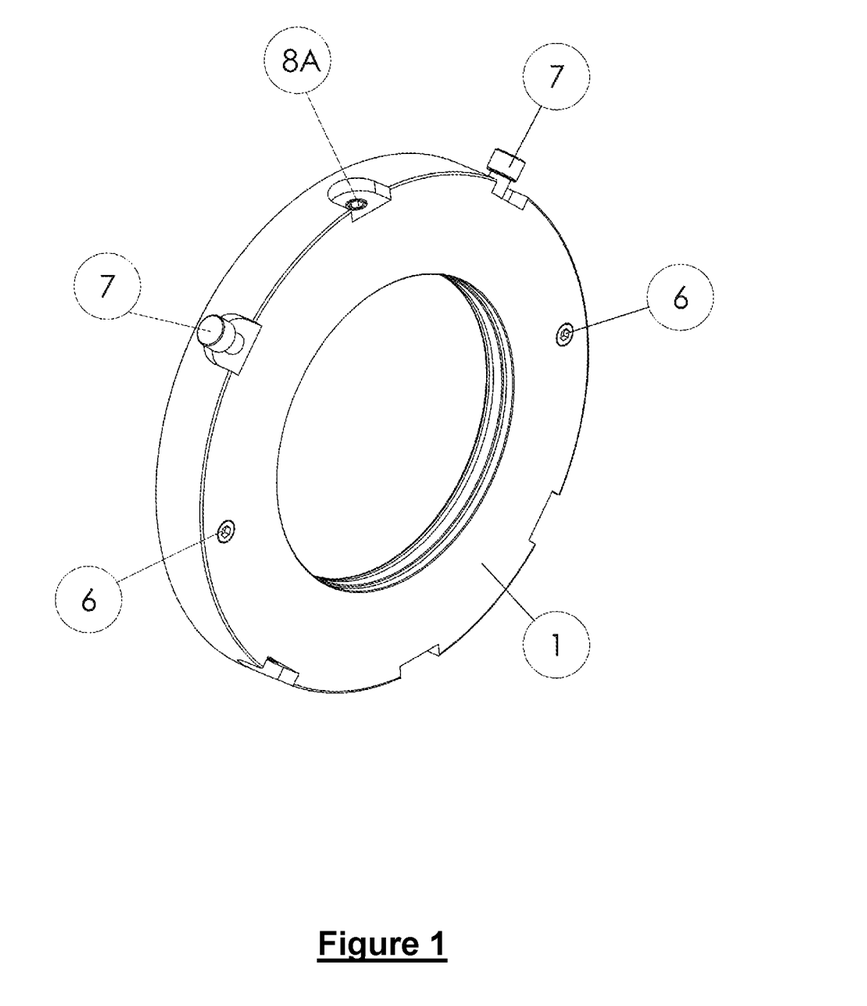
FIG. 1: shows a perspective view of a system for grounding bearings of rotary electric machines according to the invention.
Figure 2:
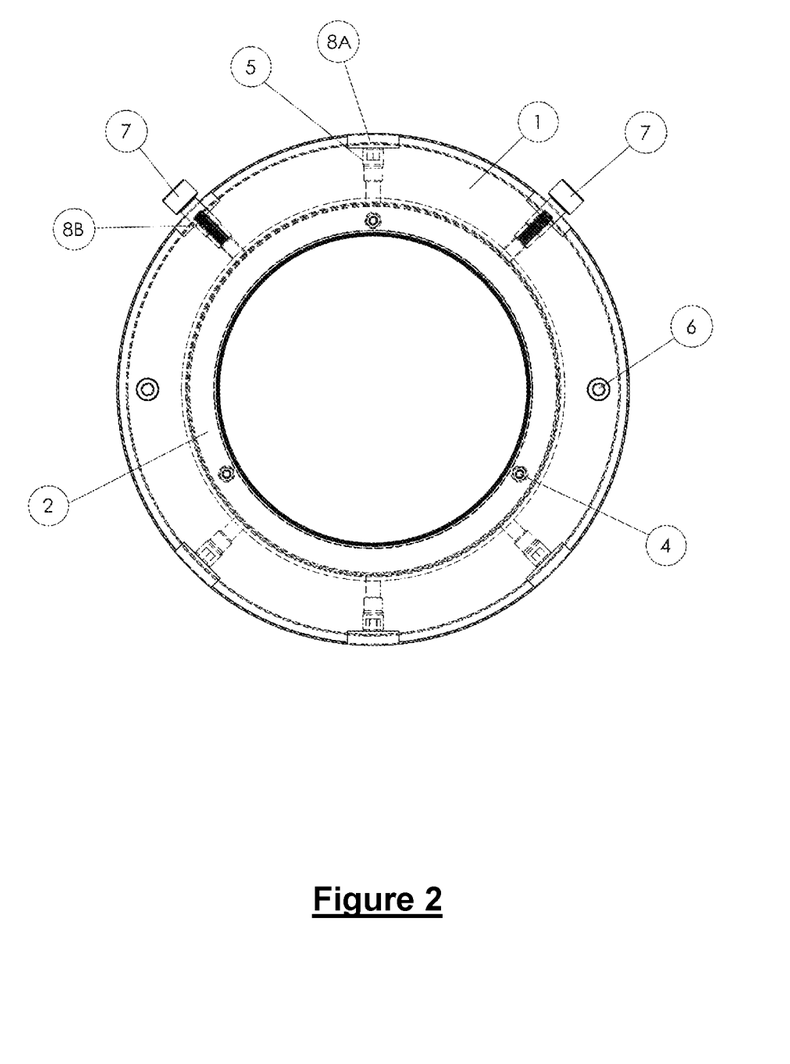
FIG. 2: shows a front view of a system for grounding bearings of rotary electric machines according to the invention.
Figure 3:
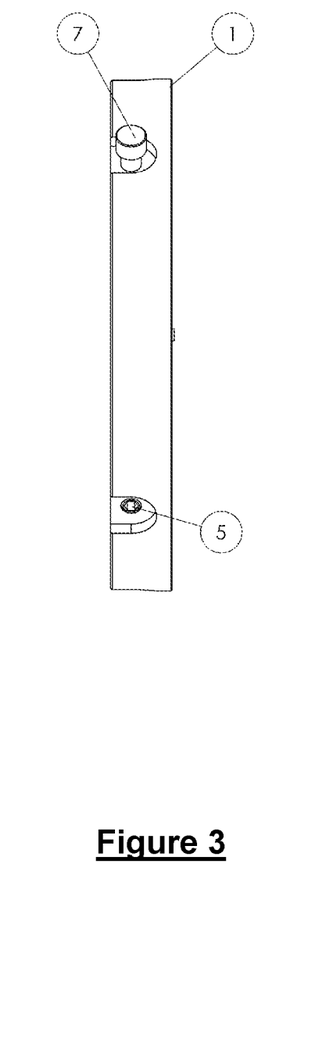
FIG. 3: shows a side view of a system for grounding bearings of rotary electric machines according to the invention.
Figure 4:
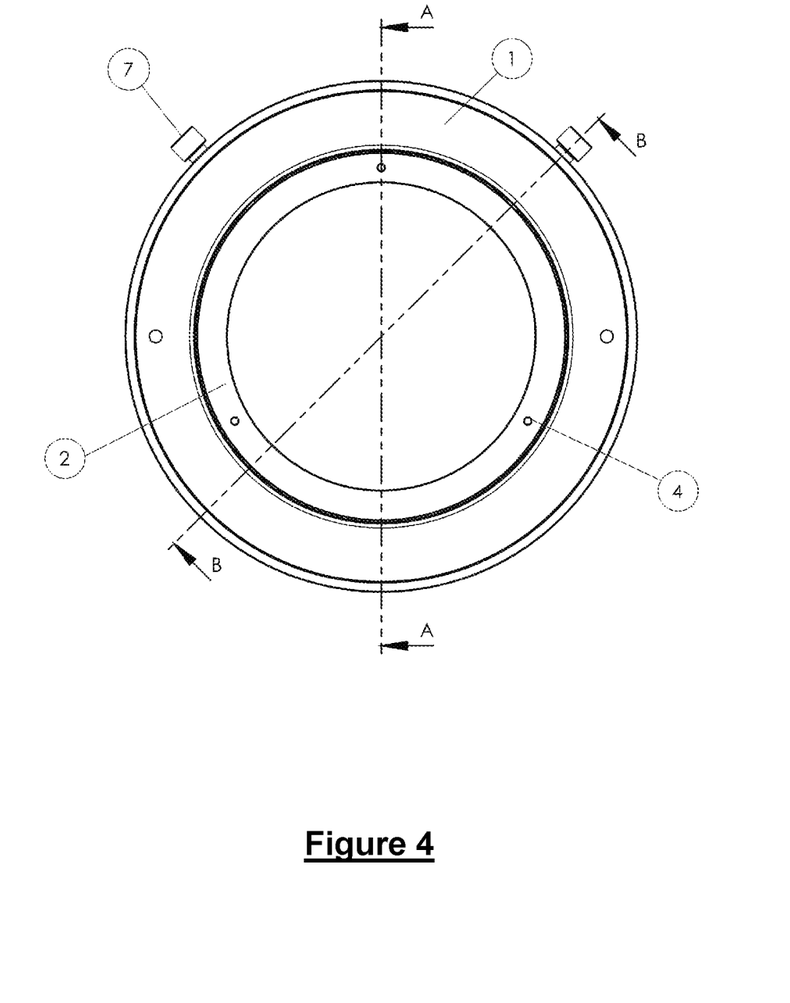
FIG. 4: shows a front view of a system for grounding bearings of rotary electric machines according to the invention.
Figure 5:
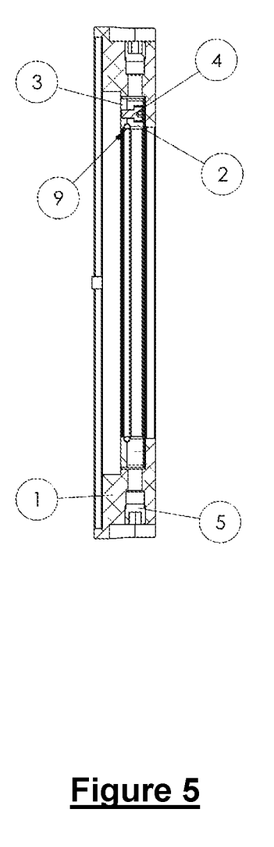
FIG. 5: shows a side view of the A-A section of FIG. 4.
Figure 6:
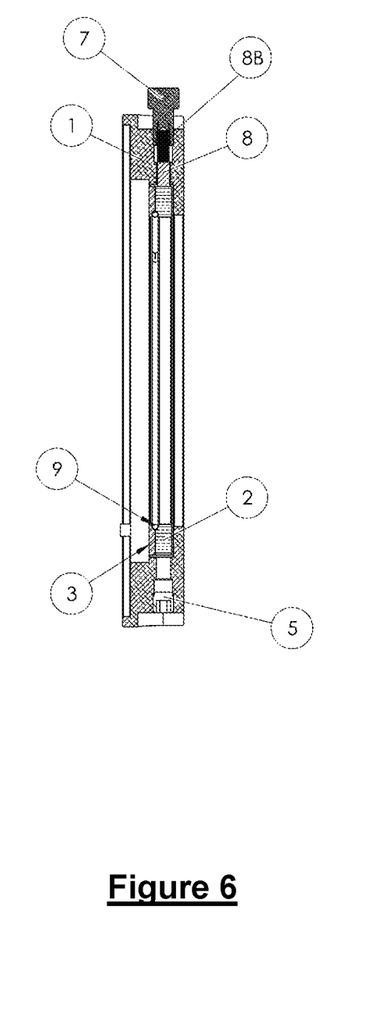
FIG. 6: shows a side view of the B-B section of FIG. 4.
Figure 7:
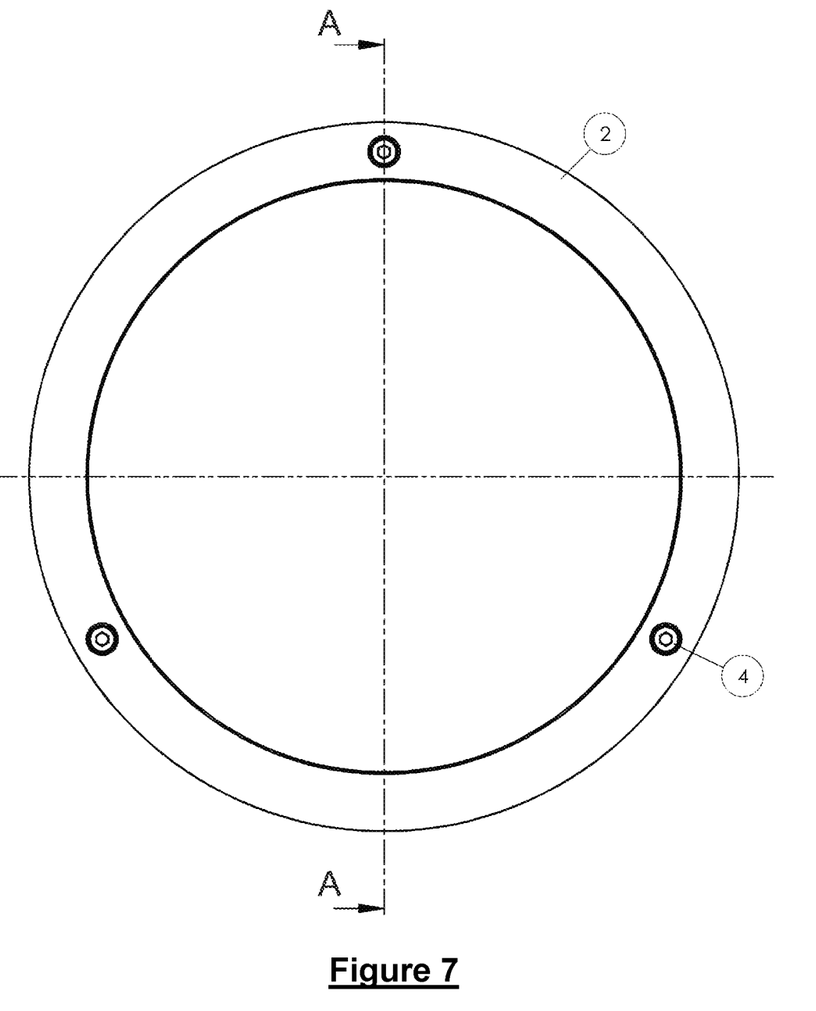
FIG. 7: shows a front view of the assembly of the contact ring track.
Figure 8:
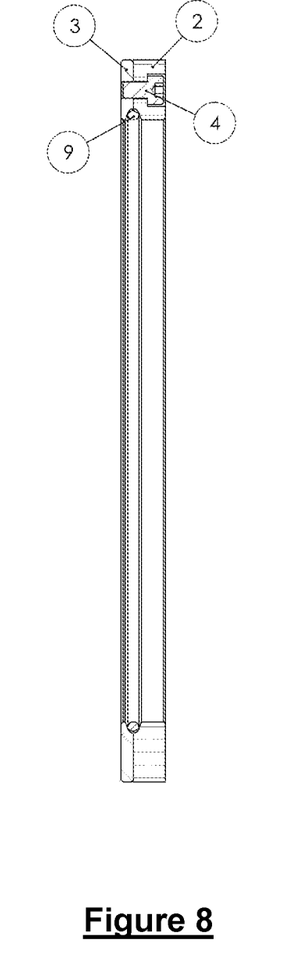
FIG. 8: shows a side view of the A-A section of FIG. 7.

The assembly of the contact track is formed by a contact ring (2), of a material with conductivity higher than that of steel, preferably copper, by which the contact with the grounding brushes (8) and their fastening elements occurs, which are: a support ring (3), compressive fastening element (9) and the elements for fastening the rings (4).

When the element for fastening the rings (4) from this assembly is tight, it promotes the approximation of the support ring (3) and the contact ring (2). In the internal diameter of these rings (2, 3), chamfers are machined, wherein the compressive fastening element (9) is housed. With the approach of the rings (2, 3), the angle between the chamfers closes, forcing the compressive fastening element (9) against the shaft (210) of the rotary electric machine (200). The pressure of this compressive fastening element (9) on the surface of the shaft (210) keeps the assembly fastened.

In a preferred embodiment of the invention, some of the housing holes (8A) may not be taken by the grounding brushes (8), the housing holes (8A) not being closed by closure elements (5). The closure elements (5) are, preferably, headless screws, which serve, therefore, to cover the housing holes (8A) that does not have grounding brushes (8) in its interior.

The grounding brushes (8) are, preferably, conductive material rods, especially graphite or pure graphite with metal components. They have a conductive spring (8B) fastened to its upper end, and a point of electrical contact on the end of the conductive spring (8B).

The fastening of grounding brushes (8) can be made in any of the housing holes (8A) present on the outer ring (1). The housing holes (8A) have a part of its length threaded, and the part smooth. The smooth part only houses the grounding brushes (8), keeping them radially positioned in relation to the shaft (210). In the threaded part of the housing holes (8A) the elements for adjusting the brush (7) are mounted, which limit the length of each of the housing holes (8A) in order to compress the conductive springs (8B) of the grounding brushes (8).

In the apparent end of the elements for adjusting the brushes (7), there is a knurled handle so that they can be mounted and removed without the use of tools providing access to the grounding brushes (8).

The system is provided for mounting a plurality of grounding brushes (8), in several positions and that can be disposed in symmetrical or non-symmetrical positions.

The purpose of the system (100) is to provide an alternative path to the bearing (not shown) to the effective drainage of the electric current.

Figure 9:
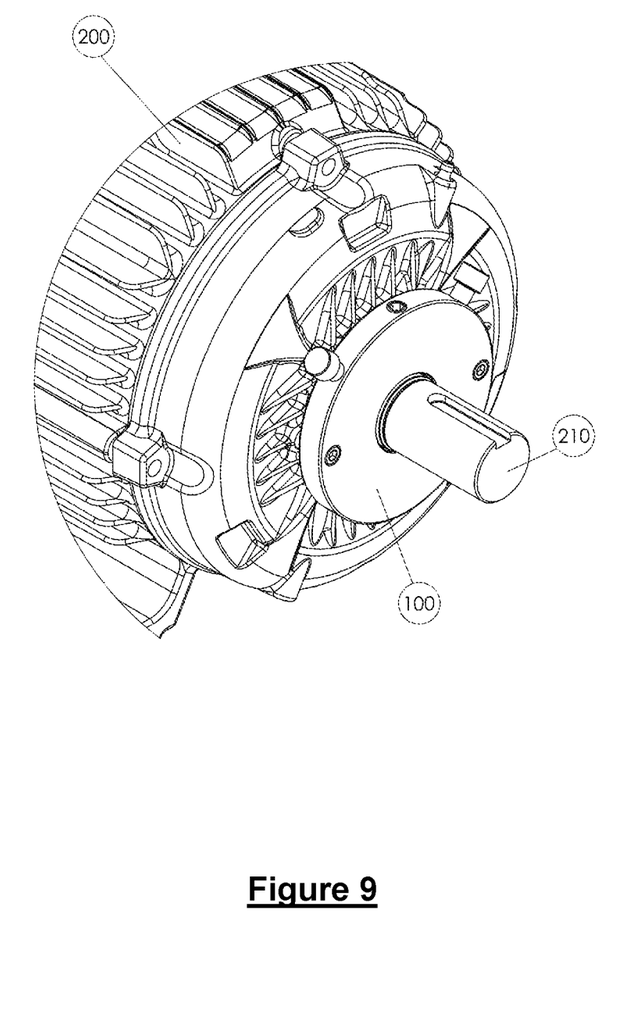
FIG. 9: shows a perspective view of a system for grounding bearings of a rotary electric machine comprising a system according to the invention.

This current passes from the shaft (210) of the rotary electric machine (200) to the contact ring (2) track mounted on the shaft (210) and then being transferred to the grounding brushes (8) in contact with it. The grounding brushes (8) are held in contact with the contact ring (2) track by means of conductive springs (8B), made of conductive material, with an electrical contact on its end. This contact transfers the current to the elements for adjusting the brushes (7) and to the outer ring (1) that supports the assembly. Therefrom, accordingly, the electric current may flow to grounding (not shown) through contact between the system (100) of the invention and the machined surface of the bearing cover of the rotary electric machine (200).

The conductive brushes (8) and the contact track of the contact ring (2) are strongly protected by the outer ring (1). This outer ring (1) can still be adapted to the installation of seals in its front part; the level of protection of the system can be raised up to the IP66 level.

CONCLUSION

It will be easily understood by those skilled in the art that changes can be made in the present invention without departing from the concepts exposed in the above description. These modifications must be regarded as included in the scope of the present invention. Consequently, the particular embodiments detailed above are only illustrative and exemplary and are non-restrictive as to the scope of the present invention, to which the full extent of the appended set of claims must be observed, and any and all correspondents thereof.

The invention claimed is:

1. A system for grounding bearings of rotary electric machines controlled by frequency converters, comprising: an outer ring, a contact ring, a support ring, elements for fastening the rings, optional closure elements, elements for fastening an assembly, elements for adjusting a brush, the brush made of a conductive material and a compressive fastening element, wherein the outer ring is provided with between two and six housing holes for housing one or more grounding brushes, wherein a chamfer is machined in an internal diameter of the contact ring and the support ring wherein the compressive fastening element is housed.

2. A system, according to claim 1, wherein the fastening of the assembly is made by the tightening of the elements for fastening the rings, whereby the rings are brought closer together and the decrease of the angle between the chamfers, forcing the compressive fastening element against the shaft of the rotary electric machine.

3. A system, according to claim 1, wherein the housing holes when unused are closed by closure elements.

4. A system, according to claim 1, wherein the grounding brushes are conductive material rods comprising pure graphite or graphite with metal components and comprise a conductive spring fastened to its upper end, and an electrical contact point on the end of the conductive spring.

5. A system, according to claim 1, wherein the housing holes comprise part of its length threaded, and part of it smooth.

6. A system, according to claim 1, wherein in the apparent end of the elements for adjusting the brushes, there is a knurled handle.

7. A system, according to claim 1, wherein a front part of the outer ring can also comprise one or more seals.

8. An electric machine comprising a system for grounding bearings of rotary electric machines controlled by frequency converters, comprising an outer ring, a contact ring, a support ring, elements for fastening the rings, optional closure elements, elements for fastening an assembly, elements for adjusting a brush, the brush made of a conductive material and a compressive fastening element, wherein the outer ring is provided with between two and six housing holes for housing one or more grounding brushes wherein in an internal diameter of the contact ring and the support ring chamfers are machined wherein the compressive fastening element is housed, wherein the fastening of the assembly is made by the tightening of the elements for fastening the rings, whereby the rings are brought closer together and an angle between chamfers of the contact ring and the support ring decreases, forcing the compressive fastening element against the shaft of the rotary electric machine.

9. An electric machine, according to claim 8, wherein the housing holes, when not used, are closed by closure elements.

10. An electric machine, according to claim 8, wherein the grounding brushes are conductive material rods comprising pure graphite or graphite with metal components and comprise a conductive spring fastened to its upper end, and an electrical contact point on the end of the conductive spring.

11. An electric machine, according to claim 8, wherein the housing holes comprise part of its length threaded, and part of it smooth.

12. An electric machine, according to claim 8, wherein in the apparent end of the elements for adjusting the brushes, there is a knurled handle.

13. An electric machine, according to claim 8, wherein a front part of the outer ring can also comprise one or more seals.

* * * * *